(12) United States Patent
Choi et al.

(10) Patent No.: US 12,068,505 B2
(45) Date of Patent: Aug. 20, 2024

(54) SECONDARY BATTERY

(71) Applicant: LG ENERGY SOLUTION, LTD., Seoul (KR)

(72) Inventors: Soon Hyung Choi, Daejeon (KR); Sun Kyu Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 253 days.

(21) Appl. No.: 17/423,310

(22) PCT Filed: Oct. 29, 2019

(86) PCT No.: PCT/KR2019/014400
§ 371 (c)(1),
(2) Date: Jul. 15, 2021

(87) PCT Pub. No.: WO2021/058664
PCT Pub. Date: May 6, 2021

(65) Prior Publication Data
US 2022/0085461 A1 Mar. 17, 2022

(51) Int. Cl.
*H01M 50/54* (2021.01)
*H01M 50/105* (2021.01)
*H01M 50/55* (2021.01)

(52) U.S. Cl.
CPC ......... *H01M 50/54* (2021.01); *H01M 50/105* (2021.01); *H01M 50/55* (2021.01)

(58) Field of Classification Search
CPC .... H01M 50/54; H01M 50/105; H01M 50/55; H01M 50/463; H01M 50/178;
(Continued)

(56) References Cited

U.S. PATENT DOCUMENTS 9,214,651 B1 * 12/2015 Ahn .................. H01M 10/4257
9,246,195 B1 1/2016 Ahn et al.
(Continued)

FOREIGN PATENT DOCUMENTS

CN 101350254 A 1/2009
CN 107431177 A 12/2017
(Continued)

OTHER PUBLICATIONS

English Translation of KR20140079031A, Secondary battery and method for manufacturing the same; LG Chemical LTD, Chae Won Pyo; Jun. 26, 2014 (Year: 2014).*
(Continued)

*Primary Examiner* — Matthew T Martin
*Assistant Examiner* — Adam J Francis
(74) *Attorney, Agent, or Firm* — Birch, Stewart, Kolasch & Birch, LLP

(57) ABSTRACT

A secondary battery includes an electrode assembly having positive electrodes, of which positive electrode tabs are connected to each other, and negative electrodes, of which negative electrode tabs are connected to each other, the electrode assembly having a quadrangular shape, a space part that is an empty space is defined between two sides facing each other, and the positive electrode tabs and the negative electrode tabs are positioned within the space part, a positive electrode lead having one end connected to the positive electrode tabs, a negative electrode lead having one end connected to the negative electrode tabs, and a pouch in which the electrode assembly is embedded is provided. The other end of the positive electrode lead and the other end of the negative electrode lead pass through the pouch to protrude from one of the largest surfaces of the pouch to the outside.

8 Claims, 10 Drawing Sheets

(58) Field of Classification Search
CPC .. H01M 50/183; H01M 50/20; H01M 50/557; H01M 10/0585; H01M 10/052
See application file for complete search history.

(56) References Cited

U.S. PATENT DOCUMENTS

| | | | |
|---|---|---|---|
| 10,003,112 | B1 | 6/2018 | Boor et al. |
| 2009/0021891 | A1 | 1/2009 | Higashi et al. |
| 2009/0081552 | A1 | 3/2009 | Shah et al. |
| 2010/0173194 | A1* | 7/2010 | Fujiya ................. H01M 50/557 156/252 |
| 2011/0039131 | A1* | 2/2011 | Moon ................. H01M 50/586 29/623.5 |
| 2012/0015236 | A1 | 1/2012 | Spare |
| 2012/0088147 | A1* | 4/2012 | Moon ................. H01M 50/121 429/179 |
| 2012/0270074 | A1 | 10/2012 | Koh |
| 2012/0276419 | A1 | 11/2012 | Park |
| 2014/0113184 | A1* | 4/2014 | Hamel .............. H01M 10/0436 429/163 |
| 2014/0302379 | A1 | 10/2014 | Nam et al. |
| 2015/0010805 | A1 | 1/2015 | Han et al. |
| 2015/0044536 | A1* | 2/2015 | Kwon ................. H01M 50/105 429/185 |
| 2015/0064507 | A1 | 3/2015 | Koh |
| 2015/0214578 | A1 | 7/2015 | Spare |
| 2015/0340664 | A1* | 11/2015 | Takahashi ........... H01M 50/121 429/127 |
| 2015/0340700 | A1* | 11/2015 | Kwon ................. H01M 50/50 429/186 |
| 2016/0093920 | A1 | 3/2016 | Lee |
| 2016/0218396 | A1 | 7/2016 | Park et al. |
| 2016/0268658 | A1 | 9/2016 | Kong et al. |
| 2017/0141438 | A1 | 5/2017 | Lee |
| 2018/0090737 | A1* | 3/2018 | Sawanishi ........... H01M 50/211 |
| 2018/0183106 | A1* | 6/2018 | Hong ................. H01M 10/0585 |
| 2019/0074549 | A1 | 3/2019 | Spare |
| 2020/0185665 | A1 | 6/2020 | Takahashi et al. |

FOREIGN PATENT DOCUMENTS

| | | | |
|---|---|---|---|
| CN | 109873100 A | 6/2019 | |
| EP | 3279976 A1 | 2/2018 | |
| ER | 10-1858680 B1 | 5/2018 | |
| JP | 2004-095357 A | 3/2004 | |
| JP | 2006-32240 A | 2/2006 | |
| JP | 2016-501423 A | 1/2016 | |
| JP | 2018-519636 A | 7/2018 | |
| KR | 10-2007-0108765 A | 11/2007 | |
| KR | 10-2010-0047283 A | 6/2010 | |
| KR | 10-2011-0017821 A | 2/2011 | |
| KR | 10-2012-0122660 A | 11/2012 | |
| KR | 10-2012-0123172 A | 11/2012 | |
| KR | 10-2013-0038927 A | 4/2013 | |
| KR | 10-2013-0105272 A | 9/2013 | |
| KR | 10-2014-0067728 A | 6/2014 | |
| KR | 20140079031 A * | 6/2014 | .......... H01M 50/107 |
| KR | 10-2014-0121706 A | 10/2014 | |
| KR | 10-152392 B1 | 5/2015 | |
| KR | 10-2015-0062942 A | 6/2015 | |
| KR | 10-2015-0135141 A | 12/2015 | |
| KR | 10-2016-0037575 A | 4/2016 | |
| KR | 10-1681758 B1 | 12/2016 | |
| KR | 10-2017-0087747 A | 7/2017 | |
| KR | 10-1775540 B1 | 9/2017 | |
| KR | 10-2018-0009269 A | 1/2018 | |
| KR | 10-2016-0072502 A | 6/2018 | |
| KR | 10-2016-0092323 A | 6/2018 | |
| KR | 10-1520393 B1 | 8/2018 | |

OTHER PUBLICATIONS

International Search Report (PCT/ISA/210) issued in PCT/KR2019/014499 dated Aug. 27, 2020.
Extended European Search Report for European Application No. 19950389.7, dated Dec. 23, 2021.

* cited by examiner

SECONDARY BATTERY

TECHNICAL FIELD

The present invention relates to a pouch-type secondary battery, and more specifically, to a secondary battery in which a positive electrode lead and a negative electrode lead are positioned at a central portion of a top surface or a bottom surface of a pouch to minimize a size of a sealing part, thereby capable of increasing in capacity to a volume and reducing a current density deviation within an electrode assembly.

BACKGROUND ART

Demands of high-efficiency secondary batteries are rapidly increasing in fields of a mobile device, an electric vehicle, or the like. However, among the secondary batteries, lithium secondary batteries having high energy density and low self-discharge characteristics and capable of maintaining relatively high voltage have been commercialized and widely used, and researches and developments for improving performances of the lithium secondary batteries have been actively conducted.

The secondary batteries have a structure in which an electrode assembly and an electrolyte are embedded within a case such as a can and a pouch. The electrode assembly has a structure in which a positive electrode, a separator, and a negative electrode are repeatedly stacked. The electrode assemblies are generally classified into a jelly-roll type and a stacked type. In the jelly-roll type, positive electrodes, separators, and negative electrodes are stacked and rolled to be embedded within a case. In the stacked type, positive electrodes, separators, and negative electrodes are cut into a certain size and stacked.

Among the types, a stacked type electrode assembly 2 is manufactured in a hexahedral shape having quadrangular top and bottom surfaces as illustrated in FIG. 1, and is embedded within a pouch that is divided into an upper part 1a and a lower part 1b. When the electrode assembly 2 is embedded within the pouch, the upper part 1a and the lower part 1b of the pouch are sealed by applying heat and a pressure on edge portions (outside a portion displayed as a dotted line on the upper part of the pouch).

However, as described above, a sealing part at which sealing is performed is disposed on each of the edge portions of the pouch and may unnecessarily occupy a space. Particularly, in a battery module, a battery pack, or the like in which a plurality of secondary batteries are mounted, the sealing part causes an increase in sizes of battery module and battery pack.

In addition, as illustrated in FIG. 1, a positive electrode terminal 3b and a negative electrode terminal 4b through which current flows are positioned on one side of the sealing part. However, in a structure, in which the positive electrode terminal 3b connected to a positive electrode tab 3a and the negative electrode terminal 4b connected to a negative electrode tab 4a are disposed to lean toward only one side, a current density deviation may increase within the electrode assembly 2 to cause generation of heat and degradation of the electrode.

DISCLOSURE OF THE INVENTION

Technical Problem

Accordingly, a main objective of the present invention is to provide a secondary battery in which the number and surface area of sealing parts are minimized to increase in capacity to a volume, and a positive electrode terminal and a negative electrode terminal are positioned at a central portion to reduce a current density deviation (a difference between a current density in the vicinity of the positive electrode terminal and the negative electrode terminal and a current density in a region away from the positive electrode terminal and the negative electrode terminal) within an electrode assembly.

Technical Solution

To achieve the above-described objects, the present invention is to provide a secondary battery having an electrode assembly including positive electrodes, of which positive electrode tabs are connected to each other, and negative electrodes, of which negative electrode tabs are connected to each other, the electrode assembly having a quadrangular shape with four sides, wherein a space part that is an empty space is defined between two sides of the four sides facing each other, and the positive electrode tabs and the negative electrode tabs are positioned within the space part; a positive electrode lead having a first end connected to the positive electrode tabs; a negative electrode lead having a first end connected to the negative electrode tabs; and a pouch in which the electrode assembly is embedded, wherein a second end of the positive electrode lead and a second end of the negative electrode lead pass through the pouch to protrude from one of the largest surfaces of the pouch to the outside.

A hole, which passes through opposite surfaces of the electrode assembly in a thickness direction between two facing horizontal sides and between two facing vertical sides, may define the space part.

Each of the positive electrode tabs positioned within the space part may be spaced a predetermined distance from each of the negative electrode tabs positioned within the space part. The hole defining the space part may have a quadrangular shape.

The pouch may have a quadrangular shape with four sides, wherein one side is opened in a state in which a remaining three sides are closed so that the electrode assembly is inserted into the pouch through the opened one side, and when the electrode assembly is inserted, the opened one side and a portion, through which each of the positive electrode lead and the negative electrode lead protrudes, are sealed. The portion of the pouch through which each of the positive electrode lead and the negative electrode protrude may be a cutout. The pouch may be a hexahedral shape having two major surfaces opposite each other and four minor surfaces connecting the two major surfaces to each other, and wherein the one of the largest surfaces may be one of the two major surfaces.

Furthermore, the present invention additionally provides a configuration in which two sub-electrode assemblies are provided. That is, the electrode assembly may be constituted by two sub-electrode assemblies, each of which has the positive electrode tabs and the negative electrode tabs protruding from a same side, wherein, in a state in which the positive electrode tabs of the sub-electrode assemblies are disposed to face each other, the facing positive electrode tabs are connected to each other, and in a state in which the negative electrode tabs of the sub-electrode assemblies are disposed to face each other, the facing negative electrode tabs are connected to each other, and wherein the sub-electrode assemblies are spaced apart from each other to define the space part between the sub-electrode assemblies.

Here, bonding of the facing positive electrode tabs and bonding of the facing negative electrode tabs may be performed through thermal fusion using ultrasonic waves in a state in which, when one tab of the positive electrode tabs is disposed below an adjacent tab of the positive electrode tabs, the adjacent tab is seated on the one tab to surface-contact each other.

Here, when the facing positive electrode tabs are bonded to each other, the positive electrode lead may be bonded together with the positive electrode tabs in a state in which the positive electrode lead is disposed on an uppermost positive electrode tab, and when the facing negative electrode tabs are bonded to each other, the negative electrode lead may be bonded together with the negative electrode tabs in a state in which the negative electrode lead is disposed on an uppermost negative electrode tab.

The pouch may be constituted by connecting two sub-pouches, into which the sub-electrode assemblies are respectively inserted, to each other. Each of the sub-pouches may have a quadrangular shape, wherein, in a state in which one side of each sub-pouch, through which the positive electrode tabs and the negative electrode tabs are exposed, is opened, and a remaining three sides are closed, the opened one sides of the sub-pouches face each other at a position at which the facing positive electrode tabs of the sub-electrode assemblies are connected to each other, and the facing negative electrode tabs of the sub-electrode assemblies are connected to each other. The opened sides may be bonded to each other to seal the inside of the pouch.

The plurality of secondary batteries having the above-described constituents may be connected to each other to additionally provide a large capacity electric storage device such as a battery module and/or a battery pack.

Advantageous Effects

The present invention comprising the above-described continents has the structure in which the positive electrode lead and the negative electrode lead pass through the pouch to protrude from one of the largest surfaces (that is, the top surface or the bottom surface) of the pouch to the outside. Thus, the number and size of the sealing parts in the pouch may be minimized, and the current density deviation within the electrode assembly may be reduced.

Furthermore, according to the present invention, the two sub-electrode assemblies are connected to each other, and the two sub-pouches are connected to each other. Thus, the sealing part on the edge portion of the pouch may be removed.

MODE FOR CARRYING OUT THE INVENTION

Figure 1:
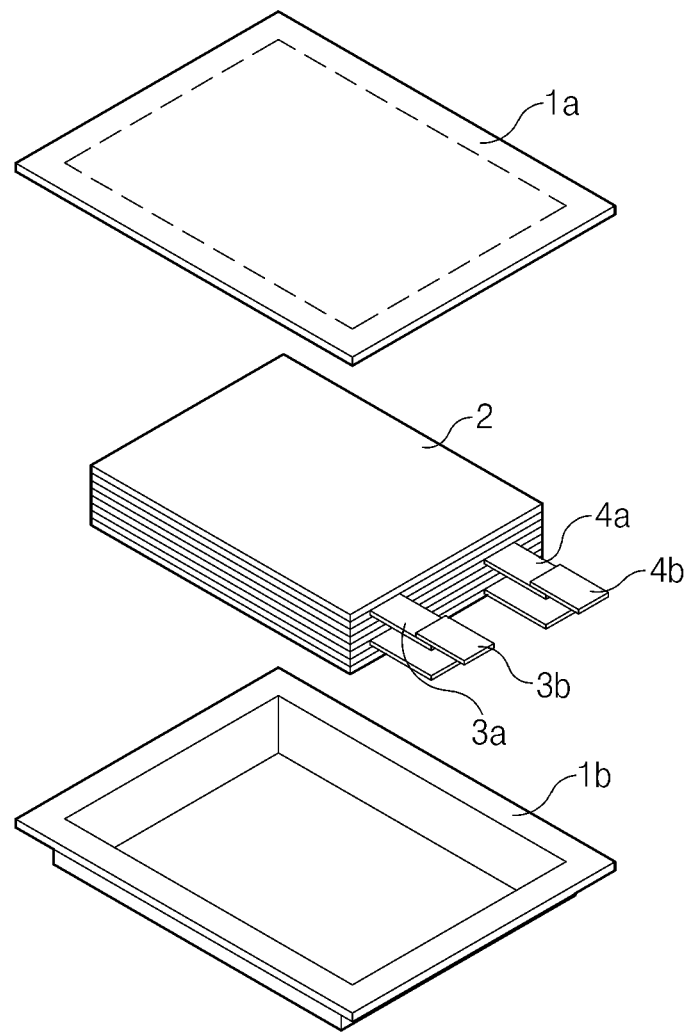
FIG. 1 is a perspective view illustrating a state before a pouch is sealed in a pouch-type secondary battery according to the related art.

Hereinafter, the present invention will be described in detail with reference to the accompanying drawings so that the present invention can be easily carried out by a person skill in the art to which the present invention pertains. However, the present invention may be embodied in several different forms, and not be limited to the embodiments set forth herein.

A part unrelated to the description will be omitted so as to clearly describe the present invention, and the same reference symbols are affixed to identical or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a secondary battery in which an electrode assembly 20 comprising positive electrodes 23, of which positive electrode tabs 20a are connected to each other, and negative electrodes 25, of which negative electrode tabs 22a are connected to each other, is embedded in a pouch 10. A positive electrode lead 20b connected to the positive electrode tabs 20a and a negative electrode lead 22b connected to the negative electrode tabs 22a are positioned at a central portion of the pouch 10 to achieve a reduction in current density deviation. Hereinafter, embodiments according to the present invention will be described in more detail with reference to the accompanying drawing.

First Embodiment

Figure 2:
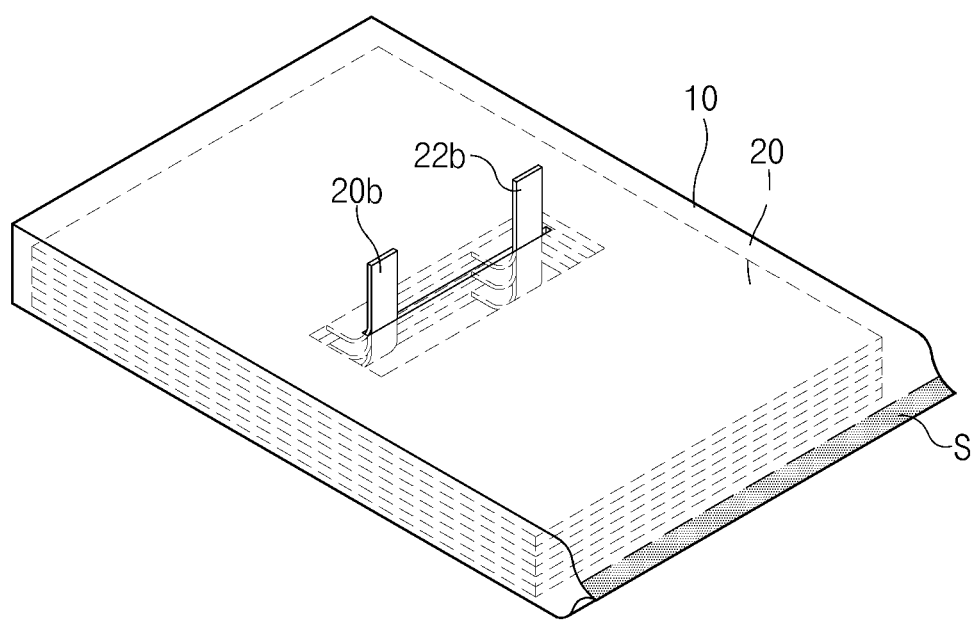
FIG. 2 is a perspective view illustrating the inside of a secondary battery according to a first embodiment of the present invention.
Figure 3:
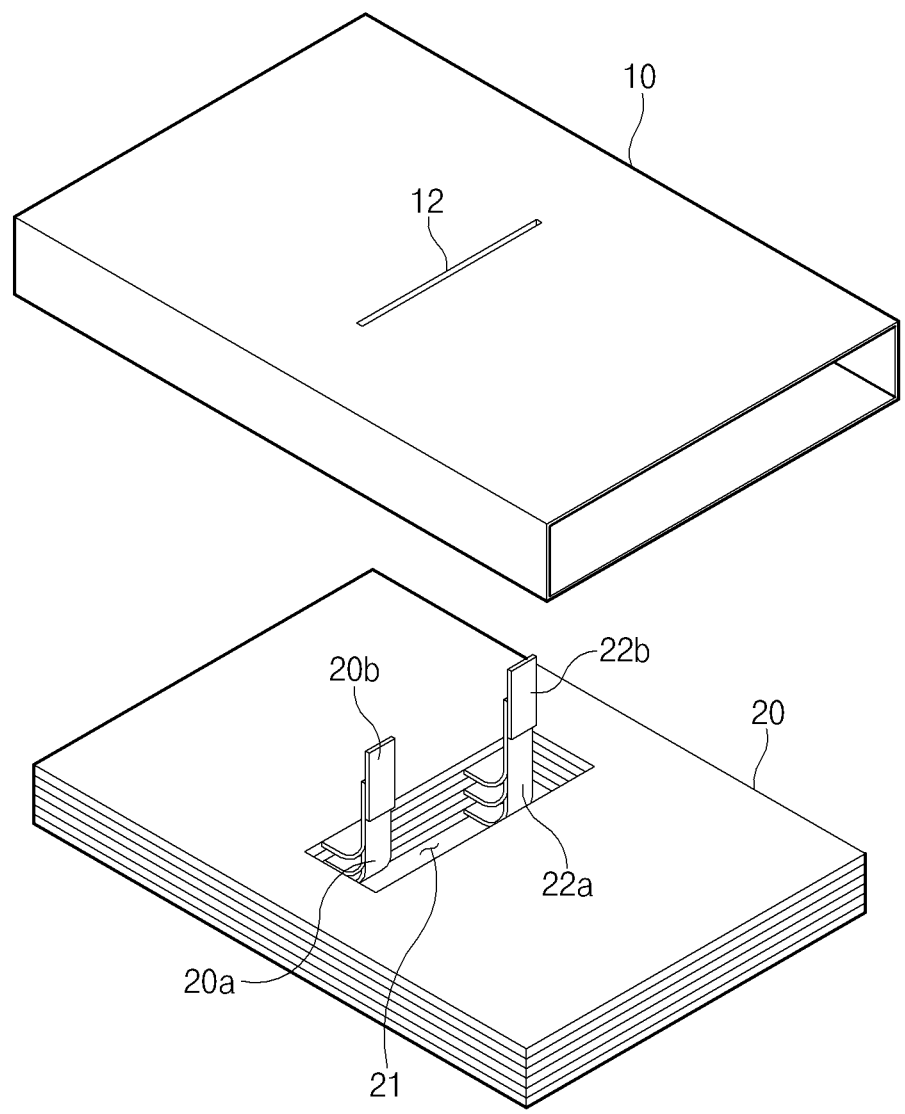
FIG. 3 is a perspective view illustrating a state before an electrode assembly is embedded within a pouch in the secondary battery of FIG. 2.
Figure 4:
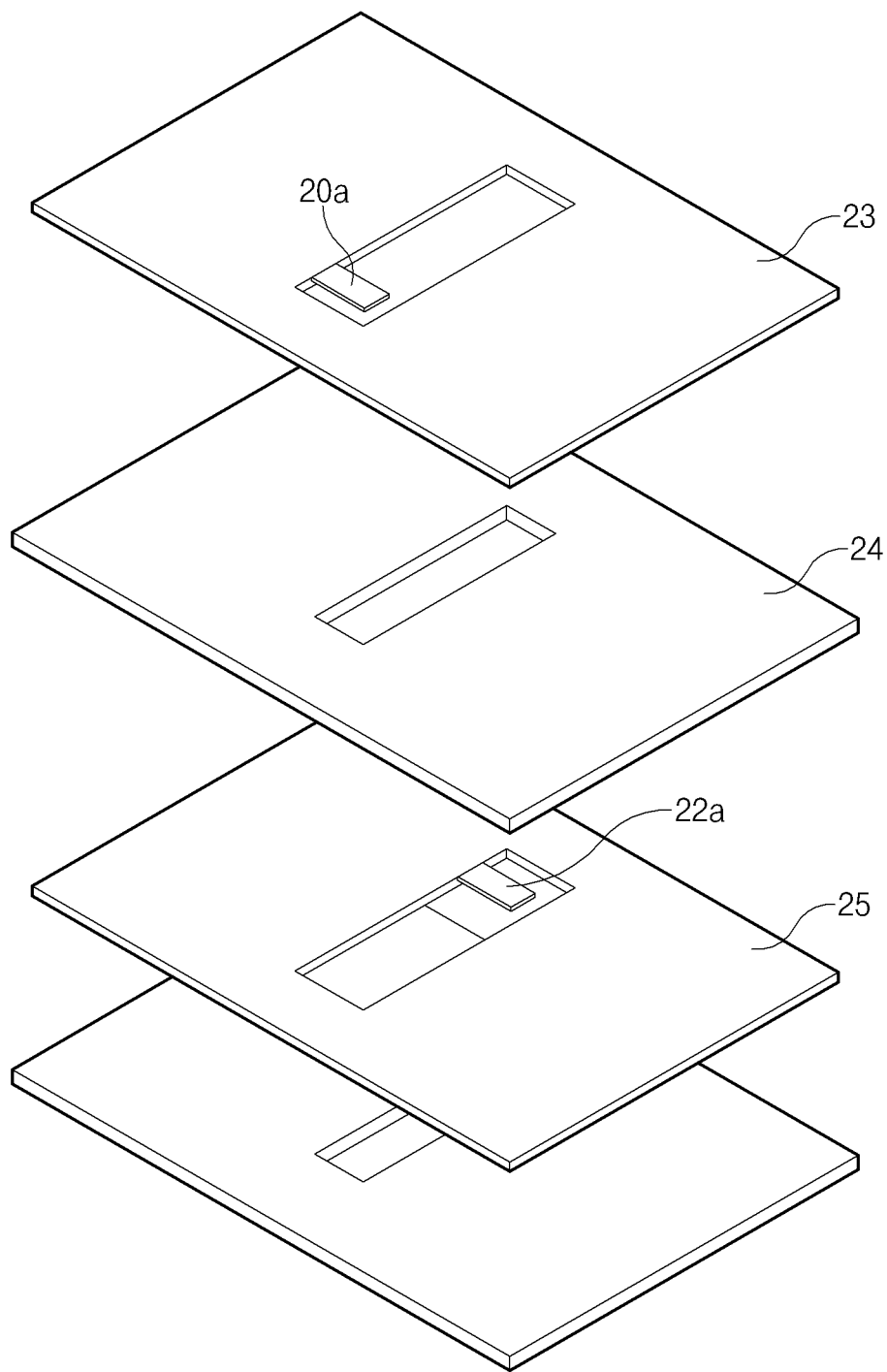
FIG. 4 is an exploded perspective view of a positive electrode, a separator, and a negative electrode which constitute the electrode assembly according to the first embodiment.
Figure 5:
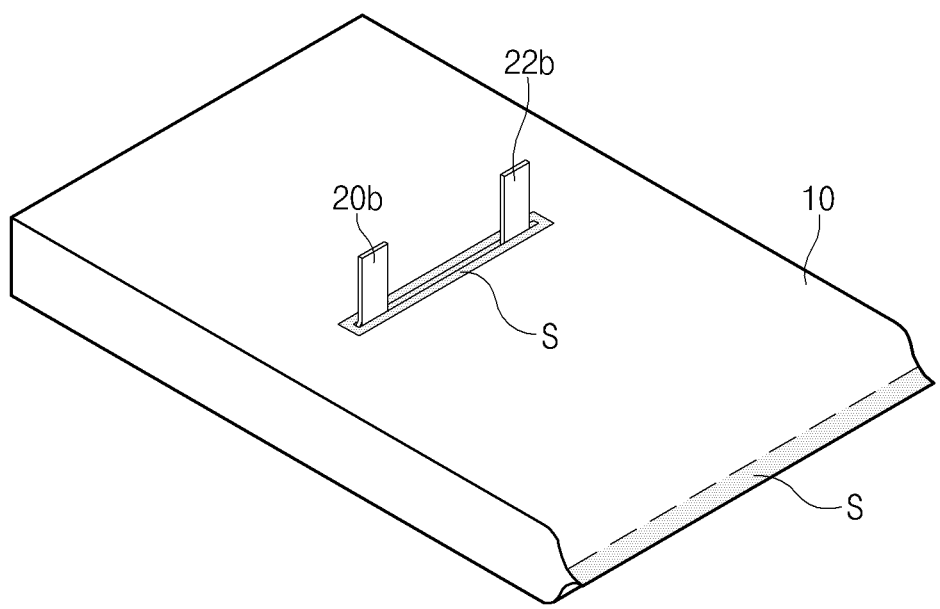
FIG. 5 is a perspective view illustrating a sealing part S defined in the secondary battery according to the first embodiment.

FIG. 2 is a perspective view illustrating the inside of a secondary battery according to a first embodiment of the present invention, and FIG. 3 is a perspective view illustrating a state before an electrode assembly is embedded within a pouch. Referring to the drawings, an electrode assembly 20 in the embodiment has a quadrangular shape with four sides (that is, side surfaces) and is constituted by repeatedly stacking a positive electrode 23, a separator 24, and a negative electrode 25 as illustrated in FIG. 4. The electrode assembly 20 has a space part 21 that is an empty space defined between relatively short sides (horizontal sides) facing each other and between relatively long sides (vertical sides) facing each other, that is, in a region (a central portion).

A positive electrode tab 20a protruding from the positive electrode 23 and a negative electrode tab 22a protruding from the negative electrode 25 are disposed within the space part 21. That is, each of the positive electrode 23, the negative electrode 25, and the separator 24 has a structure in which a quadrangular holes is punched at the same position, as illustrated in FIG. 4, to define the space part 21 when stacked on each other. Thus, the space part 21 is constituted by stacking the quadrangular holes to pass through both surfaces of the electrode assembly in a thickness direction.

Here, as illustrated in FIG. 3, the negative electrode tabs 22a are merged together after being bent upward, and then bonded to a negative electrode lead 22b. The positive electrode tabs 20a are merged together after being bent upward, and then bonded to a positive electrode lead 20b. That is, one end of the positive electrode lead 20b and one end of the negative electrode lead 22b are bonded to the positive electrode tabs 20a and the negative electrode tab 22a, respectively. The positive electrode tabs 20a and the negative electrode tabs 22a positioned within the space part 21 are spaced a predetermined distance from each other in a width direction of the electrode assembly 20.

In addition, unlike the pouch according to the related art having the structure with the upper part and the lower part separated from each other, the pouch 10 has an opened hexahedral shape that has surfaces at the three sides and no surface at one side between a top surface and a bottom surface as illustrated in FIG. 3. Also, a cutout part 12 having a predetermined length is defined on the top surface (or the bottom surface) of the pouch 10 so that the positive electrode lead and the negative electrode lead protrude outward from the pouch.

The cutout part 12 is provided at a position overlapping the inside of the space part 21 of the electrode assembly 20 when the electrode assembly 20 is inserted into the pouch 10, and has a sufficient width and length so that the positive electrode lead 20b and the negative electrode lead 22b protrude.

Also, when the electrode assembly 20 is inserted into the pouch 10 so that the positive electrode lead 20b and the negative electrode lead 22b protrude outward from the cutout part 12, the cutout part 12 and the opened portion of the pouch 10, through which the electrode assembly 20 enters, are sealed (by applying heat and a pressure) to define a sealing part S.

Here, the opened portion through which the electrode assembly 20 enters may be sealed when a pressure is vertically applied in a state in which upper and lower inner surfaces are in contact with each other. On the other hand, the cutout part 12 may be sealed by applying heat and a pressure in a state in which edge portions of the cutout part 12 are pulled to overlap each other, or may be sealed by applying heat and a pressure in a state in which the cutout part 12 is covered with a cover (not shown) made of the same material as the pouch 10. Alternatively, the sealing may be established by applying an adhesive material that ensures appropriate insulating properties and sealing performance.

In the embodiment, the pouch 10 has the quadrangular hexahedron shape with the four sides between the top surface and the bottom surface. Only the one side surface is opened in a state in which the three side surfaces are closed so that the electrode assembly 20 is inserted. When the electrode assembly 20 is inserted, the opened side surface and the portion, through which the positive electrode lead and the negative electrode lead protrude, are sealed. Thus, the number of sealing parts may be reduced to increase in volume of the electrode assembly to a total volume, thereby increasing in capacity when compared to the structure having the four sealing parts according to the related art.

Also, in the embodiment, the positive electrode lead 20b and the negative electrode lead 22b protrude outward through the cutout part 12, and the cutout part 12 is disposed to be positioned at a central portion of the top surface or the bottom surface of the pouch 10. Thus, a difference (a current density deviation) between a current density in the vicinity of a positive electrode terminal and a negative electrode terminal and a current density in a region away from the positive electrode terminal and the negative electrode terminal within the electrode assembly may be minimized to increase in charging/discharging efficiency and retard the degradation of the electrodes.

Therefore, the secondary battery provided in the embodiment has the constituents and effects which satisfy the objective of the present invention that is intended to provide the secondary battery having the increasing capacity to the volume and the reduced current density deviation.

Second Embodiment

In the embodiment, two sub-electrode assemblies 40 and 50 are connected to each other to constitute an electrode assembly, and two sub-pouches 30 and 60 are connected to each other to constitute a pouch.

Figure 6:
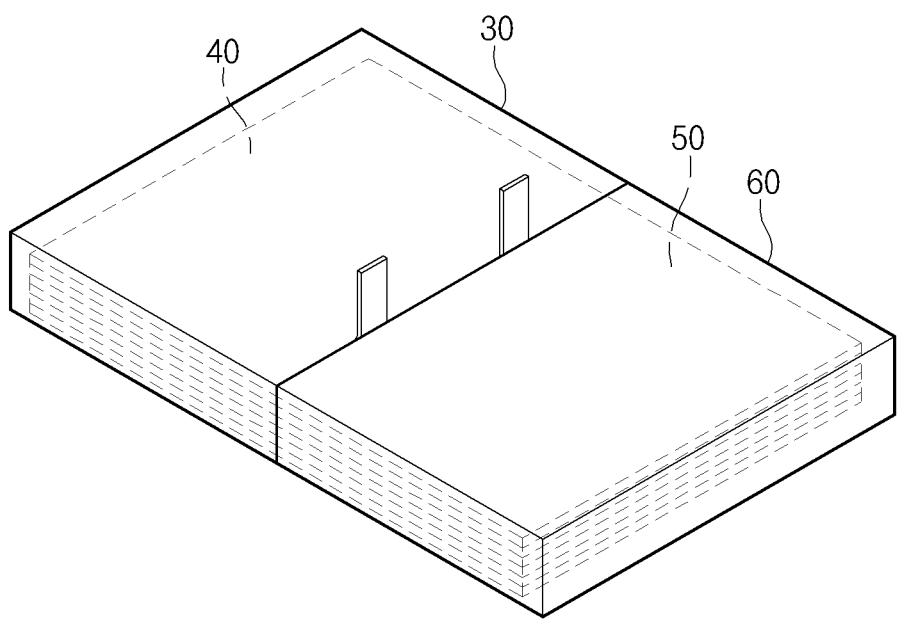
FIG. 6 is a perspective view illustrating the inside of a secondary battery according to a second embodiment of the present invention.
Figure 7:
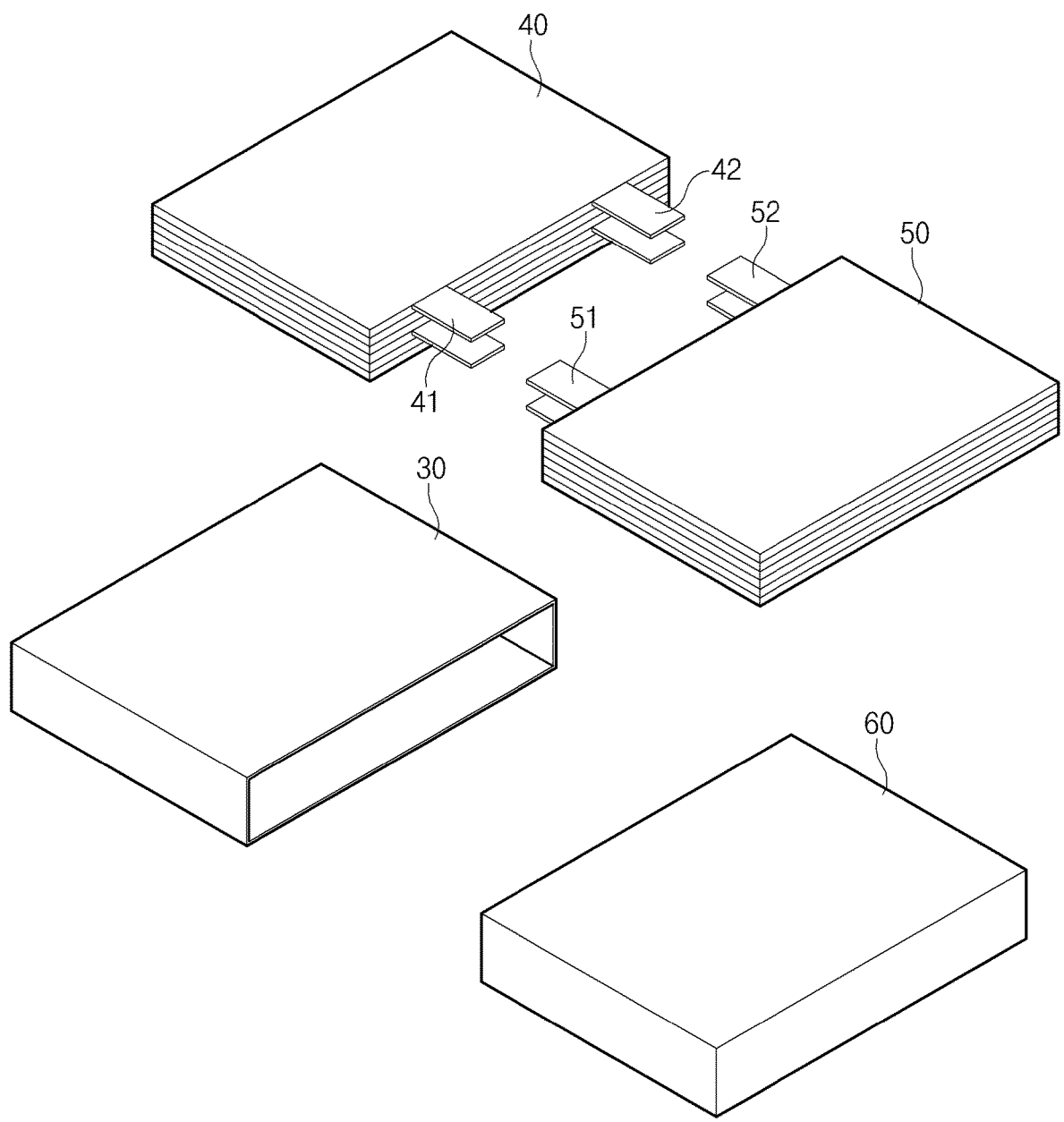
FIG. 7 is an exploded perspective view of sub-electrode assemblies and sub-pouches in the secondary battery according to the second embodiment.

FIG. 6 is a perspective view illustrating the inside of a secondary battery according to a second embodiment of the present invention, and FIG. 7 is an exploded perspective view of sub-electrode assemblies and sub-pouches. In the embodiment as illustrated, a positive electrode, a separator, and a negative electrode are sequentially stacked in each of the sub-electrode assemblies 40 and 50. Positive electrode tabs 41 and 51 merged together after protruding from the positive electrodes and negative electrode tabs 42 and 52 merged together after protruding from the negative electrodes protrude from the same side.

Figure 8:
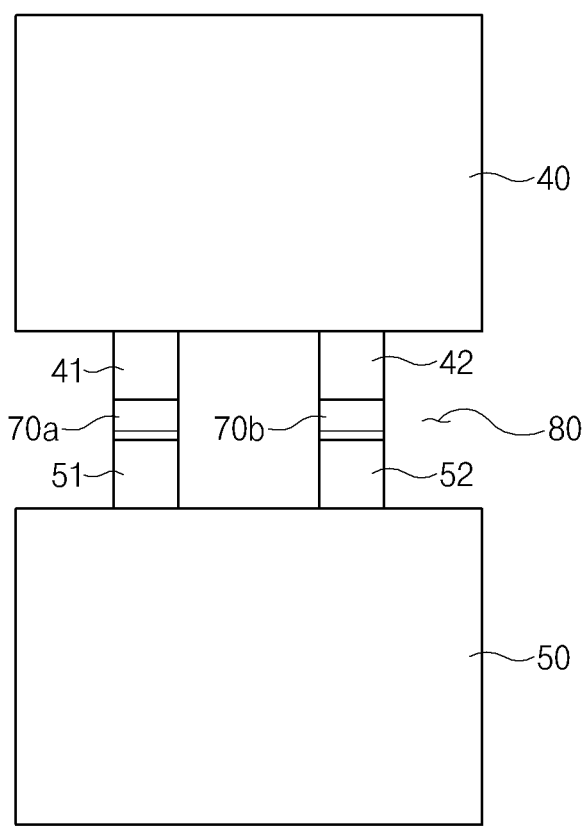
FIG. 8 is a plan view illustrating a state in which the sub-electrode assemblies are coupled to each other.

In a state in which the positive electrode tabs 41 and 51 of the sub-electrode assemblies 40 and 50 are disposed to face each other, and the negative electrode tabs 42 and 52 of the sub-electrode assemblies 40 and 50 face each other, the facing positive electrode tabs 41 and 51 are connected to each other, and the facing negative electrode tabs 42 and 52 are connected to each other, as illustrated in FIG. 8. Here, the sub-electrode assemblies 40 and 50 are spaced apart from each other to define a space part 80, and the space part 80 preferably has a minimum size to occupy a small space within the pouch.

Figure 9:
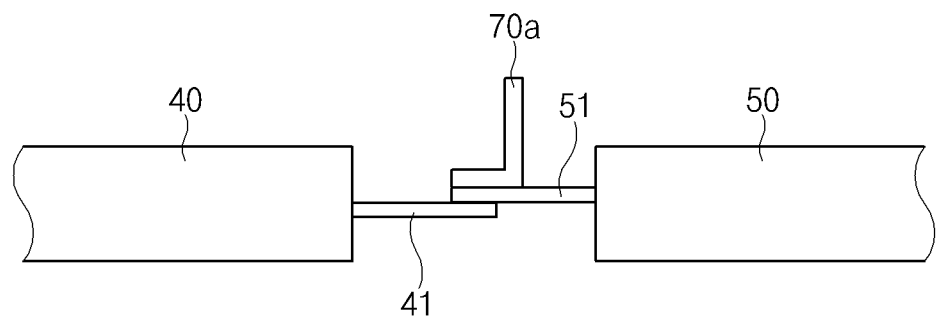
FIG. 9 is a side view illustrating a state in which the sub-electrode assemblies are coupled to each other.
Figure 10:
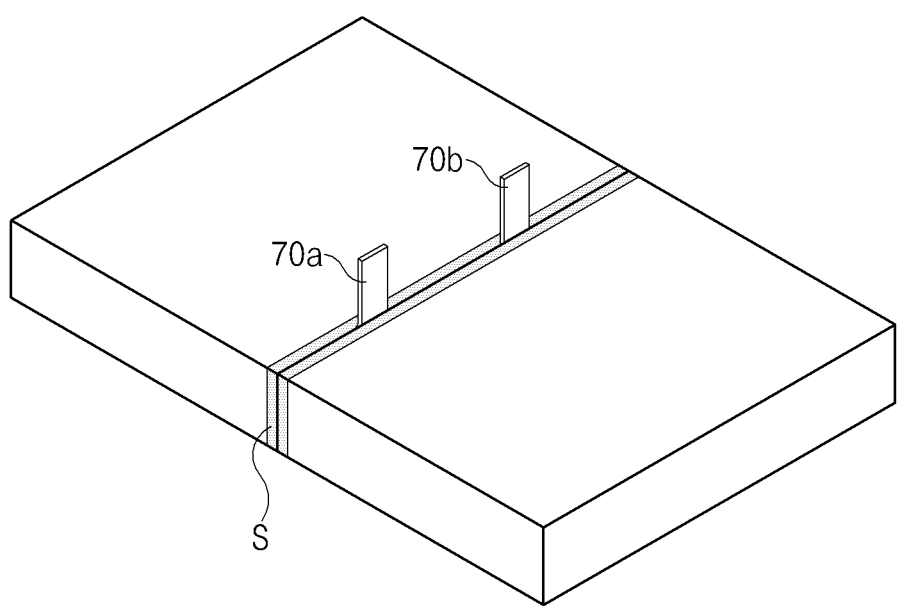
FIG. 10 is a perspective view illustrating a sealing part S defined in the secondary battery according to the second embodiment.

As more clearly illustrated in FIG. 9, bonding of the facing positive electrode tabs 41 and 51 and bonding of the facing negative electrode tabs 42 and 52 are performed through thermal fusing using ultrasonic waves in a state in which, when one tab is disposed below the other tab, the other tab is seated on the one tab to surface-contact the one tab.

Here, when the facing positive electrode tabs 41 and 51 are bonded to each other, a positive electrode lead 70a is bonded together with the positive electrode tabs 41 and 51 in a state in which the positive electrode lead is disposed on the uppermost positive electrode tab. Similar to the bonding structure of the positive electrode tabs, when the facing negative electrode tabs 42 and 52 are bonded to each other, a negative electrode lead 70b is bonded together with the negative electrode tabs 42 and 52 in a state in which the negative electrode lead is disposed on the upper most negative electrode tab.

The pouch is constituted by connecting the two sub-pouches 30 and 60, into which the sub-electrode assemblies 40 and 50 are respectively inserted, to each other. Each of the sub-pouches 30 and 60 has a quadrangular hexahedron shape. In a state in which only one side (a side surface), through which the positive electrode tab 41 or 51 and the negative electrode tab 42 or 52 are exposed, is opened, and three sides (side surfaces) are closed, the opened sides (the side surfaces) of the sub-pouches 40 and 50 face each other at a position at which the facing positive electrode tabs 41 and 51 of the sub-electrode assemblies are connected to each other, and the facing negative electrode tabs 42 and 52 of the sub-electrode assemblies are connected to each other. The opened sides (the side surfaces) are bonded to each other to seal the inside of the pouch.

Similar to the first embodiment described above, the bonding may be performed by applying the heat and pressure in a state in which edge portions are pulled to overlap each other, or may be performed by applying the heat and pressure in a state in which a portion to be bonded is covered with a cover (not shown) made of the same material as the pouch. Alternatively, the sealing may be established by applying an adhesive material that ensures insulating properties and sealing performance.

In a secondary battery according to the embodiment, the positive electrode lead 70a and the negative electrode lead 70b are positioned at a central portion of the pouch, and thus sealing parts disposed along edges of the pouch may be removed. Therefore, a capacity to a volume may increase, and a current density deviation may be reduced when compared to the related art. That is, the secondary battery provided in the embodiment also has the constituents and effects that satisfy the objective of the present invention.

In the secondary batteries according to the first embodiment and the second embodiment described above, the positive electrode lead and the negative electrode lead are positioned at the central portion of the largest surface (that is, the top surface or the bottom surface) of the pouch, and thus the capacity to the volume may increase. When the plurality of secondary batteries are electrically connected to each other to constitute a battery module and/or a battery pack, a size of the secondary battery may be reduced, and connection structures of the negative electrode lead and the positive electrode lead may be simplified.

The present invention comprising the above-described constituents has the structure in which the positive electrode lead and the negative electrode lead pass through the pouch to protrude from one of the largest surfaces of the pouch to the outside, and thus the number and size of the sealing parts in the pouch may be minimized, and the current density deviation within the electrode assembly may be reduced.

Furthermore, according to the present invention, the two sub-electrode assemblies are connected to each other, and the two sub-pouches are connected to each other. Thus, the sealing part on the edge portion of the pouch may be removed.

Although the present invention is described by specific embodiments and drawings, the present invention is not limited thereto, and various changes and modifications may be made by a person skilled in the art to which the present invention pertains within the technical idea of the present invention and equivalent scope of the appended claims.

The invention claimed is:

1. A secondary battery comprising:
    an electrode assembly including positive electrodes, of which positive electrode tabs are connected to each other, and negative electrodes, of which negative electrode tabs are connected to each other, the electrode assembly having a quadrangular shape with four sides, wherein a space part that is an empty space is defined between two sides of the four sides facing each other, and the positive electrode tabs and the negative electrode tabs are positioned within the space part;
    a positive electrode lead having a first end connected to the positive electrode tabs;
    a negative electrode lead having a first end connected to the negative electrode tabs; and
    a pouch in which the electrode assembly is embedded, wherein a second end of the positive electrode lead and a second end of the negative electrode lead pass through the pouch to protrude from one of the largest surfaces of the pouch to the outside,
    wherein the pouch has a quadrangular shape with four sides,
    wherein one side is opened in a state in which a remaining three sides are closed so that the electrode assembly is inserted into the pouch through the opened one side,
    when the electrode assembly is inserted, the opened one side and a portion, through which each of the positive electrode lead and the negative electrode lead protrudes, are sealed,
    wherein the pouch includes two major surfaces opposite each other, the four sides are four minor surfaces joining the two major surfaces to each other, and
    wherein only one of the two major surfaces has a cutout, the positive electrode lead and the negative electrode lead extending through the cutout.

2. The secondary battery of claim 1, wherein a hole, which passes through opposite surfaces of the electrode assembly in a thickness direction between two facing horizontal sides and between two facing vertical sides, defines the space part.

3. The secondary battery of claim 2, wherein each of the positive electrode tabs positioned within the space part is spaced a predetermined distance from each of the negative electrode tabs positioned within the space part.

4. The secondary battery of claim 2, wherein the hole defining the space part has a quadrangular shape.

5. A secondary battery comprising:
    an electrode assembly including positive electrodes, of which positive electrode tabs are connected to each other, and negative electrodes, of which negative electrode tabs are connected to each other, the electrode assembly having a quadrangular shape with four sides, wherein a space part that is an empty space is defined between two sides of the four sides facing each other, and the positive electrode tabs and the negative electrode tabs are positioned within the space part;
    a positive electrode lead having a first end connected to the positive electrode tabs;
    a negative electrode lead having a first end connected to the negative electrode tabs; and
    a pouch in which the electrode assembly is embedded, wherein a second end of the positive electrode lead and a second end of the negative electrode lead pass through the pouch to protrude from one of the largest surfaces of the pouch to the outside,
    wherein the electrode assembly is constituted by two sub-electrode assemblies, each of which has the positive electrode tabs and the negative electrode tabs protruding from a same side,
    wherein, in a state in which the positive electrode tabs of the sub-electrode assemblies are disposed to face each other, the facing positive electrode tabs are connected to each other, and in a state in which the negative electrode tabs of the sub-electrode assemblies are disposed to face each other, the facing negative electrode tabs are connected to each other, wherein the sub-electrode assemblies are spaced apart from each other to define the space part between the sub-electrode assemblies, wherein the pouch is constituted by connecting two sub-pouches, into which the sub-electrode assemblies are respectively inserted, to each other, and wherein each of the sub-pouches has a quadrangular shape, wherein each of the sub-pouches is integrally formed such that that one side is opened in a state in which a remaining three sides are closed, wherein the opened one sides of the sub-pouches face each other at a position at which the facing positive electrode tabs of the sub-electrode assemblies are connected to each other, and the facing negative electrode tabs of the sub-electrode assemblies are connected to each other, and wherein the opened one sides are bonded to each other to seal the inside of the pouch.

6. The secondary battery of claim 5, wherein bonding of the facing positive electrode tabs and bonding of the facing negative electrode tabs are performed through thermal fusion using ultrasonic waves in a state in which, when one tab of the positive electrode tabs is disposed below an adjacent tab of the positive electrode tabs, the adjacent electrode tab is seated on the one tab to surface-contact each other.

7. The secondary battery of claim 6, wherein, when the facing positive electrode tabs are bonded to each other, the positive electrode lead is bonded together with the positive electrode tabs in a state in which the positive electrode lead is disposed on an uppermost positive electrode tab, and when the facing negative electrode tabs are bonded to each other, the negative electrode lead is bonded together with the negative electrode tabs in a state in which the negative electrode lead is disposed on an uppermost negative electrode tab.

8. A battery module equipped with at least two or more secondary batteries of claim 1.

* * * * *